US007386536B1

(12) United States Patent
Ramesh et al.

(10) Patent No.: US 7,386,536 B1
(45) Date of Patent: Jun. 10, 2008

(54) STATISTICAL REPRESENTATION OF SKEWED DATA

(75) Inventors: Bhashyam Ramesh, San Diego, CA (US); Olli Pekka Kostamaa, Santa Monica, CA (US)

(73) Assignee: Teradata US, Inc., Miamisburg, OH (US)

( * ) Notice: Subject to any disclaimer, the term of this patent is extended or adjusted under 35 U.S.C. 154(b) by 513 days.

(21) Appl. No.: 10/751,016

(22) Filed: Dec. 31, 2003

(51) Int. Cl.
G06F 7/00 (2006.01)
G06F 17/30 (2006.01)

(52) U.S. Cl. .............................. 707/2; 707/102; 707/1; 707/101

(58) Field of Classification Search ................ 707/101, 707/1, 2, 100, 102
See application file for complete search history.

(56) References Cited

U.S. PATENT DOCUMENTS

| 5,689,696 | A | * | 11/1997 | Gibbons et al. ................ 707/1 |
| 5,758,338 | A | * | 5/1998 | Faloutsos et al. .............. 707/6 |
| 5,950,185 | A | * | 9/1999 | Alon et al. ..................... 707/1 |
| 5,977,906 | A | * | 11/1999 | Ameen et al. ............... 342/174 |
| 6,477,523 | B1 | * | 11/2002 | Chiang ........................... 707/2 |
| 6,508,771 | B1 | * | 1/2003 | Padmanabhan et al. ...... 600/515 |
| 6,691,099 | B1 | * | 2/2004 | Mozes ............................. 707/2 |
| 6,732,085 | B1 | * | 5/2004 | Mozes ............................. 707/2 |
| 6,738,511 | B1 | * | 5/2004 | Farrell et al. ............... 382/168 |
| 6,944,331 | B2 | * | 9/2005 | Schmidt et al. ............. 382/165 |
| 2003/0088401 | A1 | * | 5/2003 | Terez ......................... 704/207 |
| 2003/0133615 | A1 | * | 7/2003 | Bern et al. .................. 382/225 |
| 2003/0156303 | A1 | * | 8/2003 | Schnee et al. .............. 358/509 |
| 2003/0212702 | A1 | * | 11/2003 | Campos et al. ............. 707/102 |
| 2004/0090453 | A1 | * | 5/2004 | Jasinschi et al. ............ 345/723 |

OTHER PUBLICATIONS

Microsoft Computer Dictionary, Third Edition, Microsoft press, 1997, pp. 234.*

* cited by examiner

Primary Examiner—Hosain Alam
Assistant Examiner—Usmaan Saeed
(74) Attorney, Agent, or Firm—Howard Speight

(57) ABSTRACT

A method, database system, and computer program for collecting statistics about a table are disclosed. The table includes one or more rows and each row includes a respective value. The method includes creating zero or more histogram buckets. Each histogram bucket includes a width representing a respective range of values and a height representing a count of rows having values in the range of values. The method further includes creating one or more high-bias buckets, each high-bias bucket represents one or more values that appear in a minimum percentage of rows.

15 Claims, 11 Drawing Sheets

STATISTICAL REPRESENTATION OF SKEWED DATA

BACKGROUND

Collecting statistics on the data stored in a database system is useful for predicting the cost to access the data. Statistics are useful for choosing between competing access methods, for example, if the database system can predict a cost of using each of the competing methods based on the statistics. Data in some databases is skewed toward certain values making a statistical representation of the data challenging.

SUMMARY

In general, in one aspect, the invention features a method for representing statistics about a table. The table includes one or more rows and each row includes a respective value. The method includes creating zero or more histogram buckets. Each histogram bucket includes a width representing a respective range of values and a height representing a count of rows having values in the range of values. The method further includes creating one or more high-bias buckets. Each high-bias bucket represents one or more values that appear in a minimum percentage of rows.

Implementation of the invention may include one or more of the following. The method may create a total number of buckets. The total number of buckets may be a fixed number that is equal to the sum of the number of histogram buckets and the number of high-bias buckets. Creating the high-bias and histogram buckets may include (a) determining an average height of the histogram buckets. Creating the high-bias and histogram buckets may also include (b) based on the average height of the histogram buckets, determining a reclassification threshold. Creating the high-bias and histogram buckets may also include (c) representing each value that exceeds the reclassification threshold in a high-bias bucket. The reclassification threshold may be equal to the average height of the histogram buckets multiplied by (1+S), where S is a positive percentage represented as a decimal. Creating the high-bias and histogram buckets may also include repeating (a), (b), and (c) until no value exceeds the reclassification threshold.

Creating the high-bias and histogram buckets may include (d) determining an average height of the histogram buckets. Creating the high-bias and histogram buckets may also include (e) determining a reclassification threshold, based on the average height of the histogram buckets. Creating the high-bias and histogram buckets may also include (f) for each value that exceeds the reclassification threshold:

(1) if all of the high-bias buckets are not full, representing the value in a high-bias bucket;

(2) else, if the number of high-bias buckets is less than a fixed number of high-bias buckets:

(i) creating a new high-bias bucket; and (ii) representing the value in the new high-bias bucket.

The reclassification threshold may be equal to the average height of the histogram buckets multiplied by (1+S), where S is a positive percentage represented as a decimal. Creating the high-bias and histogram buckets may also include repeating (d), (e), and (f) until no value exceeds the reclassification threshold. Creating the high-bias and histogram buckets may also include repeating (d), (e), and (f) until a number of the high-bias buckets is equal to the fixed number of high-bias buckets and each of the high-bias buckets is full.

The method may include a fixed total number of buckets. The total number of buckets may be equal to the sum of a number of histogram buckets and a number of high-bias buckets. The method may include (g) identifying one or more values that appear in at least the minimum percentage of rows. The method may also include (h) representing the identified values in the high-bias buckets. The method may also include: determining a remaining number of buckets equal to the total number of buckets less the number of high-bias buckets used. The method may also include (i)(1) adjusting the minimum percentage of rows if the number of remaining buckets is greater than a stop number of buckets. The method may also include (i)(2) identifying values that appear in the adjusted minimum percentage of rows if the number of remaining buckets is greater than a stop number of buckets. The method may also include (i)(3) representing values that appear in the adjusted minimum percentage of row in high-bias buckets if the number of remaining buckets is greater than a stop number of buckets. Identifying one or more values that appear in at least the minimum percentage of rows and representing the identified values in the high-bias buckets may include setting the minimum percentage of rows to $$\frac{1}{FB}\%,$$

where F is equal to a number of high-bias values that each high-bias bucket can contain and B is equal to the total number of buckets. Adjusting the minimum percentage of rows may include setting the adjusted minimum percentage to $$\frac{V(FB-I)}{FB}\%,$$

where F is equal to a number of high-bias values that each high-bias bucket can contain, B is equal to the total number of buckets, V is equal to the minimum percentage of rows, and I is equal to a number of values represented in high-bias buckets. The method may also include: (j) representing values not represented in high-bias buckets in histogram buckets, if the number of remaining buckets is less than or equal to the stop number of buckets. The method may also include repeating (h), (i), and (j) until the number of remaining buckets is less than or equal to the stop number of buckets.

The total number of buckets may be fixed. The number of high-bias buckets may be fixed. The method may include populating the one or more high-bias buckets with the FH most frequently occurring values, where F is a number of values each high-bias bucket can store and H is the number of high-bias buckets. The method may also include populating the one or more histogram buckets with all other values.

In general, in another aspect, the invention features a database system that represents statistics about a table. The database system includes a massively parallel processing system and a process for collecting statistics. The massively parallel processing system includes one or more nodes. The massively parallel processing system also includes a plurality of CPUs. Each of the one or more nodes provides access to one or more CPUs. The massively parallel processing system also includes a plurality of data storage facilities. Each of the one or more CPUs provides access to one or more data storage facilities. The massively parallel processing system also includes P partitions, each partition residing on one or more data storage facilities. The table includes one or more rows, each row including a respective value. The process for collecting statistics includes creating zero or more histogram buckets and one or more high-bias buckets. Each histogram bucket includes a width representing a respective range of values and a height representing a count of rows having values in the range of values. Each high-bias bucket represents one or more values that appear in a minimum percentage of rows.

In general, in another aspect, the invention features a computer program stored on a tangible storage medium, for use in representing statistics in a database running in a partitioned parallel environment. The partitioned parallel environment includes P partitions. Each partition resides on one or more parallel processing systems. The database includes a first table that includes one or more rows stored in one or more of the P partitions. The program includes executable instructions that cause a computer to represent statistics about a table. The table includes one or more rows and each row includes one or more values. The program further causes the computer to create zero or more histogram buckets and to create one or more high-bias buckets. Each histogram bucket includes a width representing a respective range of values and a height representing a count of rows having values in the range of values. Each high-bias bucket represents one or more values that appear in a minimum percentage of rows.

Other features and advantages will become apparent from the description and claims that follow.

DETAILED DESCRIPTION

Figure 1:
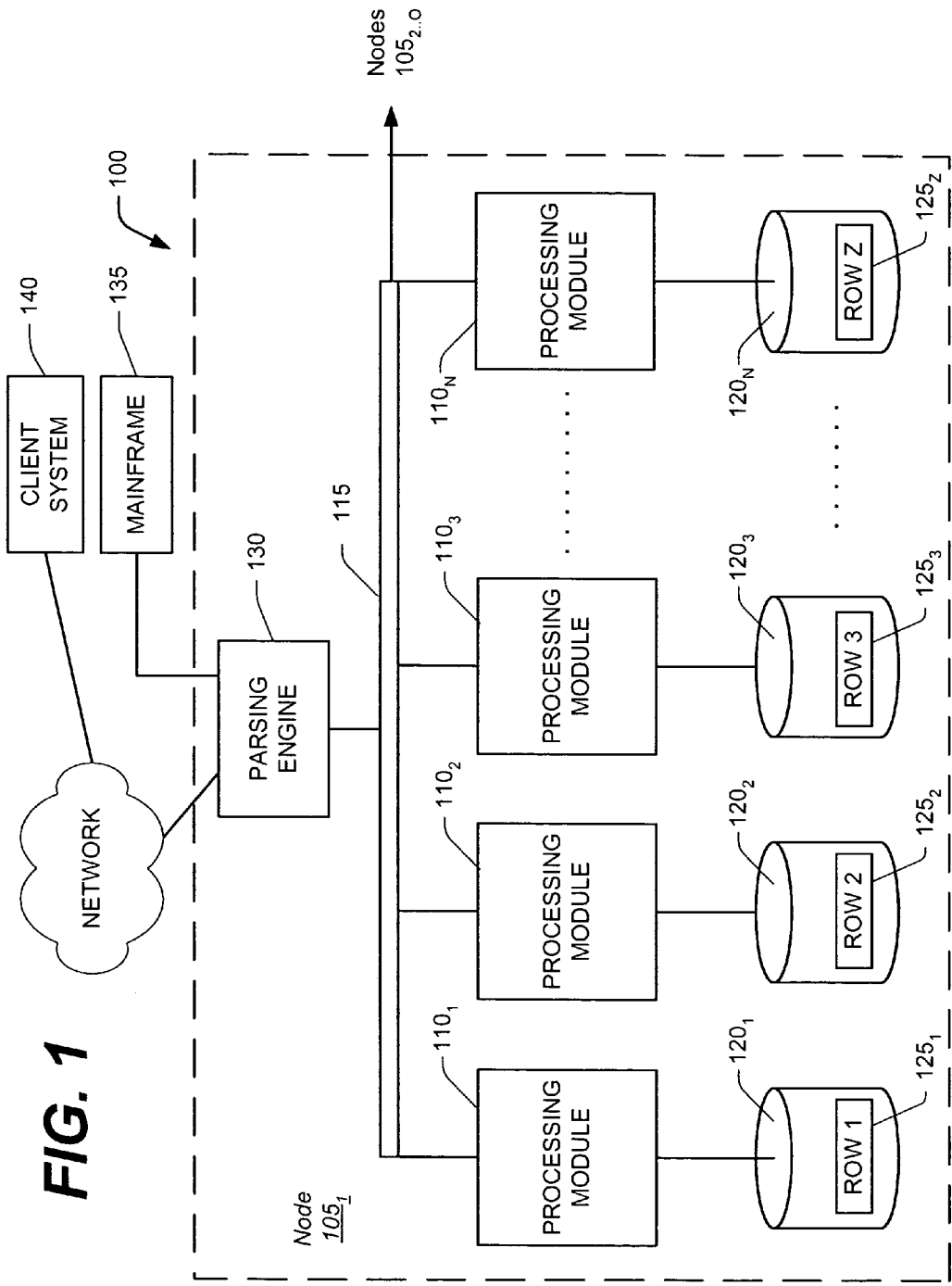
FIG. 1 is a block diagram of a node of a database system.

The techniques for statistically representing skewed data disclosed herein have particular application, but are not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
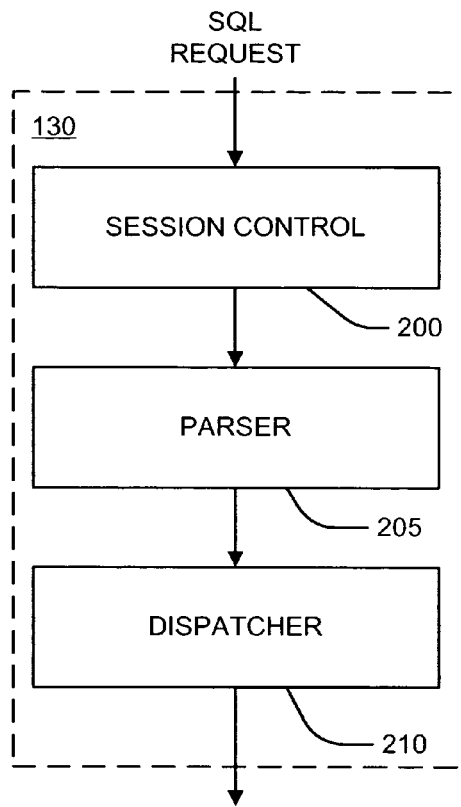
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
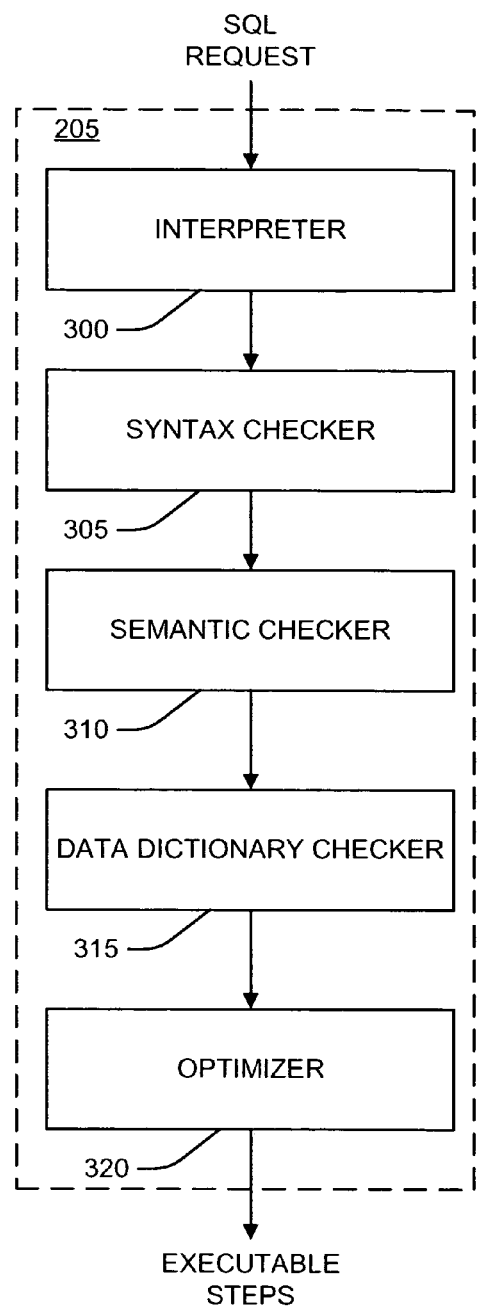
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

The system may also store statistics about the tables and indexes in the system. For example, a system may store statistics about values contained in particular columns of one table or about values contained in a particular columns of an index. In one example system, the statistics are stored in buckets, such as the buckets shown in FIGS. 5 and 7.

Figure 4:
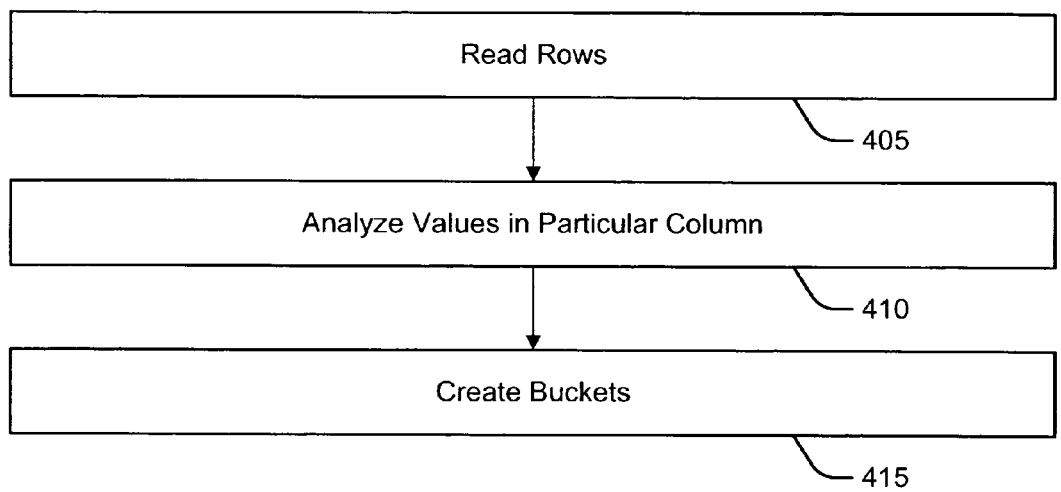
FIG. 4 is a flow chat illustrating the creation of buckets.

FIG. 4 shows an example system for creating one or more buckets. The system reads the rows in the table or the index (block 405). The system analyzes the values in the particular column of each row (block 410). For example, the system may determine the frequency of each value appearing in the particular column in all of the rows of the table. The system then creates one or more buckets representing the values in the particular column of the rows (block 415, which is shown in greater detail in FIGS. 8, 11, and 15 and discussed in greater detail below).

Figure 5:
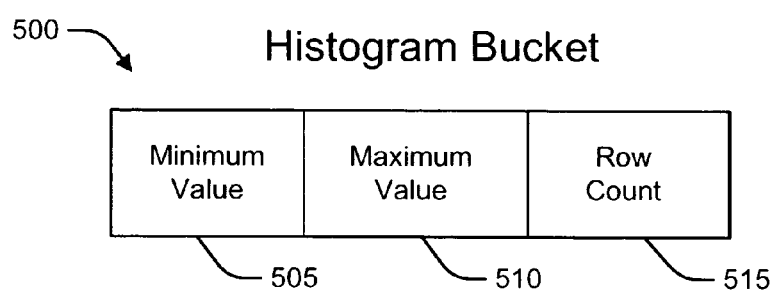
FIG. 5 illustrates an example histogram bucket.

FIG. 5 shows an example of a histogram bucket 500 capable of storing a range of values and a row count 515. The range of values stored by the histogram bucket 500 may also be referred to as a width of the bucket, and the row count 515 may also be referred to as a height of the histogram bucket 500. In the example histogram bucket 500, the range of values is represented by a minimum value 505 and a maximum value 510. The row count 515 stores a count of the rows for which the values stored in the particular column of each of the rows are within the range of values. One example system uses a plurality of histogram buckets 500 to store statistics about the rows.

Returning to FIG. 4, assume an example system for creating buckets (block 415) has one or more histogram buckets 500 and that the histogram buckets 500 are created so that the height of the buckets are equal or nearly equal. In such a system, the one or more histogram buckets 500 are called equi-height histograms. Assuming a uniform distribution of values across the rows, the equi-height histograms will allow the system to accurately predict a number of rows that will be retrieved for a SQL request, where the SQL request contains one or more predicates that involve values for which the system maintains one or more equi-height histograms.

For example, assume the system receives the following SQL request:

SELECT*FROM employees WHERE department_number>1 AND department_number<10;

Further assume that: the department_number value is uniformly distributed across the rows; department_number values range from 1 to 20; and the system maintains five histogram buckets for the department_number column. The equi-height histograms may be represented by the following three-tuples, where the first value is the minimum value 505, the second value is the maximum value 510, and the third value is the row count 515: [1, 4, 20], [5, 8, 20], [9, 12, 20], [13, 17, 20], and [18, 20, 20]. To estimate the number of rows that will result from the query, the system adds the row counts 515 of the equi-height histograms with value ranges between 1 and 10 and the result is 40. The result is a maximum number of rows the system will retrieve to perform for the example SQL request. In one example system, the maximum number of rows is used by the optimizer 320 to determine a best plan for executing the query.

Figure 6:
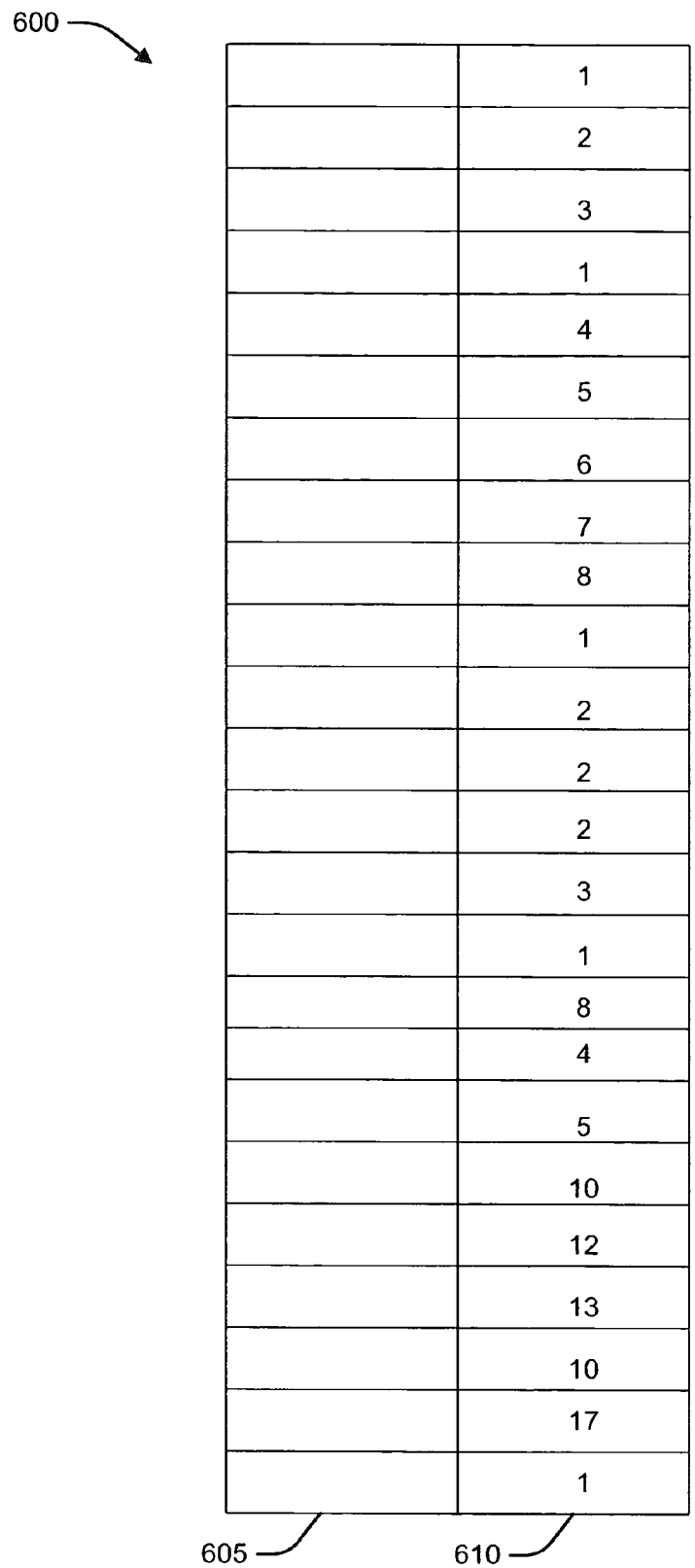
FIG. 6 illustrates an example table with skewed data.

A system that uses only histogram buckets 500 may encounter problems when dealing with non-normalized or skewed data. A highly-simplified example table with skewed data is shown in FIG. 6. Table 600 has columns 605 and 610 and 24 rows. Example values are provided for column 610. One example system having four buckets creates four histogram buckets 500, as follows: [1, 1, 5], [2, 4, 8], [5, 9, 6], and [10, 17, 5]. As can be seen, the height and width of the histogram buckets is not uniform, making the buckets less useful in statistical analysis.

Figure 7:
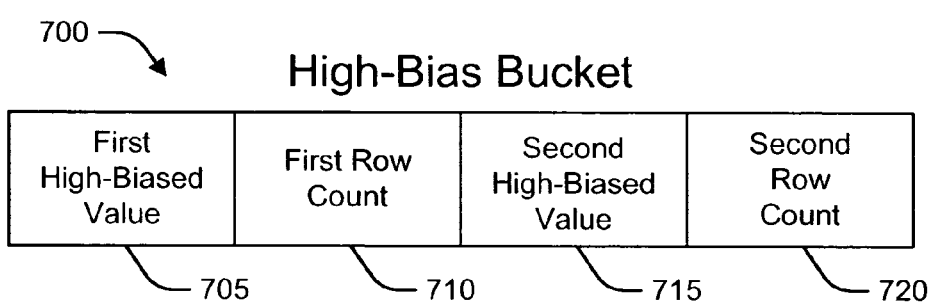
FIG. 7 illustrates an example high-bias bucket.

In order to prevent skewed data from decreasing the utility of the histogram buckets 500, skewed data may be represented in one or more high-bias buckets, such as the high-bias bucket shown in FIG. 7. High-bias bucket 700 is capable of storing a first high-bias value 705, a first row count 710, a second high-bias value 715, and a second row count 720. In the high-bias bucket 700 the first row count 710 is the number of rows in table 600 that contain high-bias value 705 and the second row count 720 is the number of rows in table 600 that contain high-bias value 715. In one example system, the first high-bias value 705 and second high-biased value 710 store values that appear in more than a minimum percentage of rows of the table or the index. In one example system, the minimum percentage is 0.5% of the rows. In other example systems, the minimum percentage of rows may be greater than or less than 0.5%.

In general, the minimum percentage of rows may be a constant or it may be determined based on characteristics of the data (e.g., a degree of skewing of the data in the rows), limits on the number of buckets, limits on the number of high-bias buckets 700, the number of high-bias values that each high-bias bucket 700 can store, or any other factor. For example, the system may set the minimum percentage of rows to $$\frac{1}{FB}\%,$$

where F is the number of high-bias values each high-bias bucket 700 can store and B is the total number of buckets.

Although the high-bias bucket 700 illustrated in FIG. 7 contains two high-bias values (705 and 715) and two row counts (710 and 720), the high-bias bucket 700 may have different structures. In one example system, the high-bias bucket 700 contains one high-bias value and one row count. In a second example system, the high-bias bucket 700 contains F high-bias values and F corresponding row counts. Such a structure may allow the system to store more high-bias values in a smaller number of buckets, allowing more buckets to be used as histogram buckets.

While the high-bias buckets 700 discussed above have an equal number of high-bias values and row counts, the high-bias bucket 700 may be structured to contain an unequal number of high-bias values and rows counts. To demonstrate this generally, in another example system, the high-bias bucket 700 contains one row count for the bucket and F high-bias values. The row count allows for an estimate of the number of rows containing each of the high-bias values because it can be assumed, for example, that the number of rows having one of the F high-bias values associated with a high-bias bucket is $$\frac{R}{F},$$

where R is the row count.

The utility of high-bias buckets with respect to skewed data will now be demonstrated. An example system creating buckets (block 415) to represent table 600 may use both histogram buckets 500 and high-bias buckets 700. One highly-simplified example system creating statistics for table 600 creates four buckets, of which one is a high-bias bucket 700 to represent values that appear in more than 10% of the rows in table 600. The created high-bias bucket 700 is represented by the following four-tuple where the first value is the first high-biased value 705, the second value is the first row count 710, the third value is the second high-biased value 715, and the fourth value is the second row count 720: [1, 5, 2, 4]. The system also creates three histogram buckets 500 to represent values that appear in fewer than 10% of the rows in table 600. The histogram buckets 500 created by the system are represented by the following three-tuples: [3, 4, 4], [5, 8, 6], and [9, 17, 5].

In a more typical system, where the system is gathering statistics about a table with many more rows than table 600, the system determines the minimum percentage of rows based on the number of high-bias buckets 700 available to represent the values in the table 600. In one example system, if there are 100 high-bias buckets 700 (i.e., B=100) and each high-bias bucket 700 can store 2 values (i.e., F=2), then the minimum percentage is set to $$\frac{1}{FB}\%,$$

or 0.5%. This minimum percentage is used because even if each of the values in the table appear in at least 0.5% of the rows, the system will never need more than 100 high-bias buckets to represent all the values.

Alternatively, the system may determine the number of high-bias buckets 700 based on a known minimum percentage. For example, in another system where the minimum percentage is set to 10% and each high-bias bucket 700 can store 2 high-bias values, the system needs 5 high-bias buckets 700. This is because if all values appear in 10% of the rows, then there will only be 10 values, which can be stored in 5 high-bias buckets 700. If each high-bias bucket can store more than the two high-bias values, then the necessary number of high-bias buckets will decrease.

In general, systems use high-bias bucket 700 to represent data sets with skewed data. An example system for creating buckets (block 415) in such an environment creates one or more high-bias buckets 700 to represent high-biased values and one or more histogram buckets 500 to represent non-high-bias values. The system may have a fixed number of buckets, which is the sum of the number of high-bias buckets 700 and the number of histogram buckets 500. For example, the system may have 100, 1000, or any other number of buckets. An example system will create high-bias buckets 700 to represent high-bias values, so that the values stored in histogram buckets will be less skewed toward the high-bias values, which in turn makes cardinality estimates more accurate.

Figure 8:
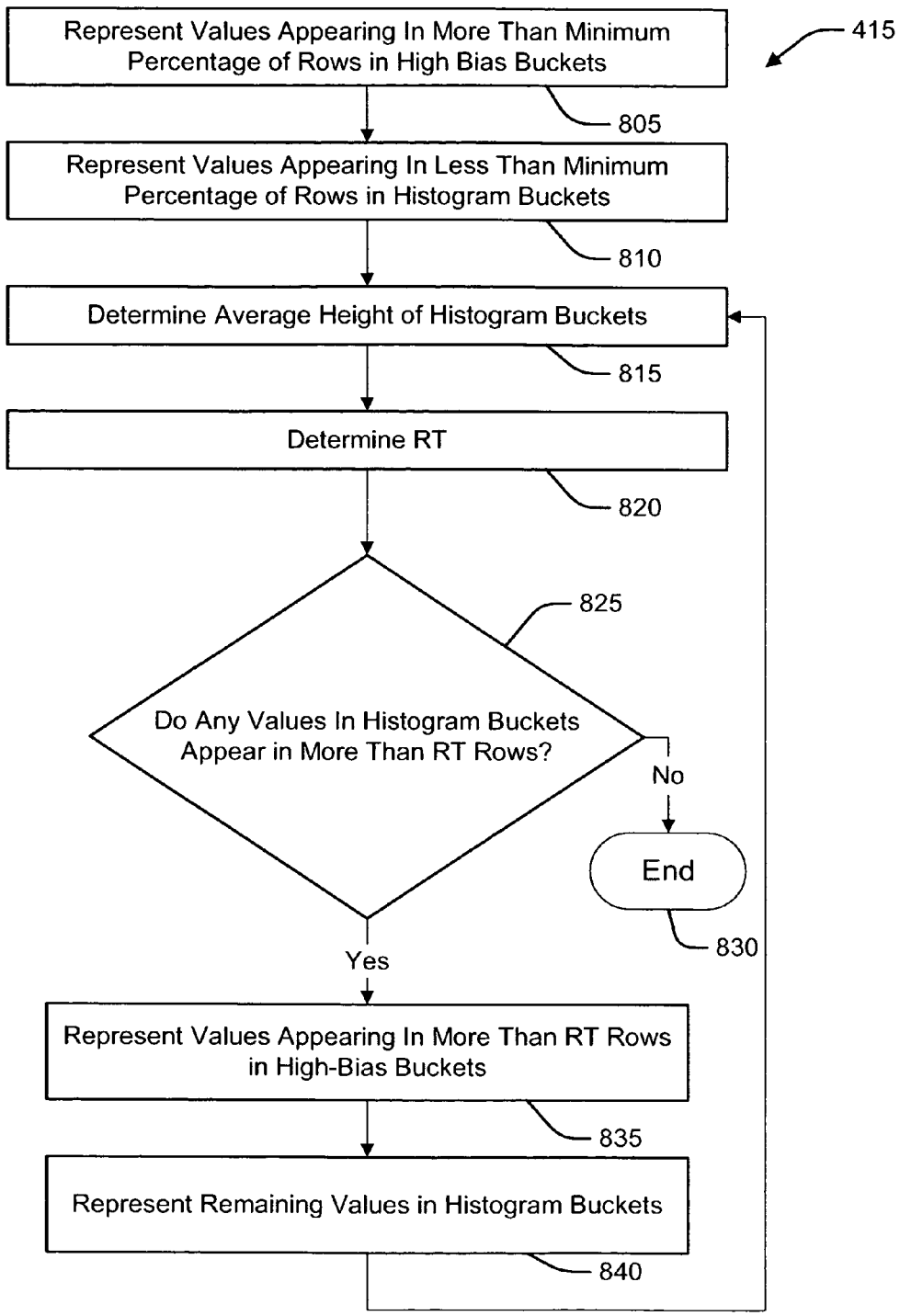
FIG. 8 is a flow chart illustrating the creation of high-bias and histogram buckets.

FIG. 8 shows an example system for creating buckets (block 415) by creating high-bias buckets 700 and histogram buckets 500 using bucketwise iteration. In this example system the total number of buckets is not fixed. The system represents values that appear in more than the minimum percentage of rows in high-bias buckets 700 (block 805). The system represents values that appear in fewer than the minimum percentage of rows in histogram buckets 500 (block 810). The system determines an average height of the histogram buckets 500 (block 815). Based on the average height of the histogram buckets 500, the system determines a number of rows in which a value must appear to be reclassified as a high-bias value, referred to as the reclassification threshold ("RT") (block 820, which is shown in greater detail in FIG. 9). The system determines if any values that are represented in histogram buckets ("non-high-bias values") appear in more than the RT of rows (block 825). If no non-high-bias values appear in more than RT rows, the bucket creation process ends (block 830). If one or more non-high-bias values appear in at least RT rows, the system represents such values in high-bias buckets 700 (block 835, which is shown in greater detail in FIG. 10). The system represents the values that do not appear in at least RT rows in histogram buckets and returns to block 815 (block 840).

In the bucketwise iteration system shown in FIG. 8, the minimum percentage of rows determines which values are initially classified as high-bias. The minimum percentage of rows, used to classify values as high-bias in block 805, may be statically or dynamically set to any percentage based on the needs of the system. One example bucketwise iteration system sets the minimum percentage of rows to 0.5%.

Figure 9:
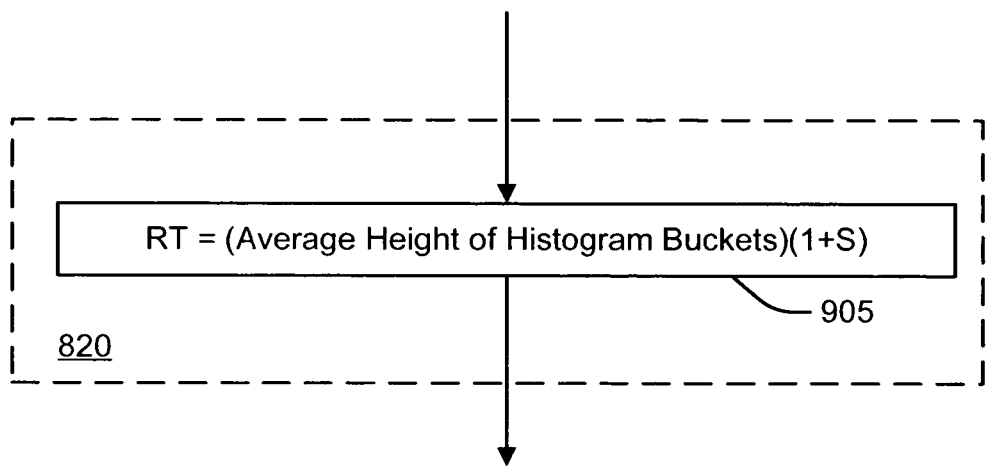
FIG. 9 is a flow chart illustrating the determination of the reclassification threshold.

While the minimum percentage of rows, discussed above, determines which values are initially classified as high-bias, the RT determines which values are moved from histogram buckets 500 to high-bias buckets 700. FIG. 9 shows an example system that determines the RT (block 820) by multiplying the average height of the histogram buckets 500 by (1+S), where S is a percentage represented as decimal (block 905). Using the formula in block 905, a value can be reclassified as a high-bias value if it appears in at least S % more rows than the average height of the histogram buckets 700. S may be any positive percentage and may be set by the user or by the system. For example, if S is 100%, then the RT equals twice the average height of the histogram buckets 700. In general, however, a different formula may be used to determine the reclassification threshold, based on the need of the system.

Figure 10:
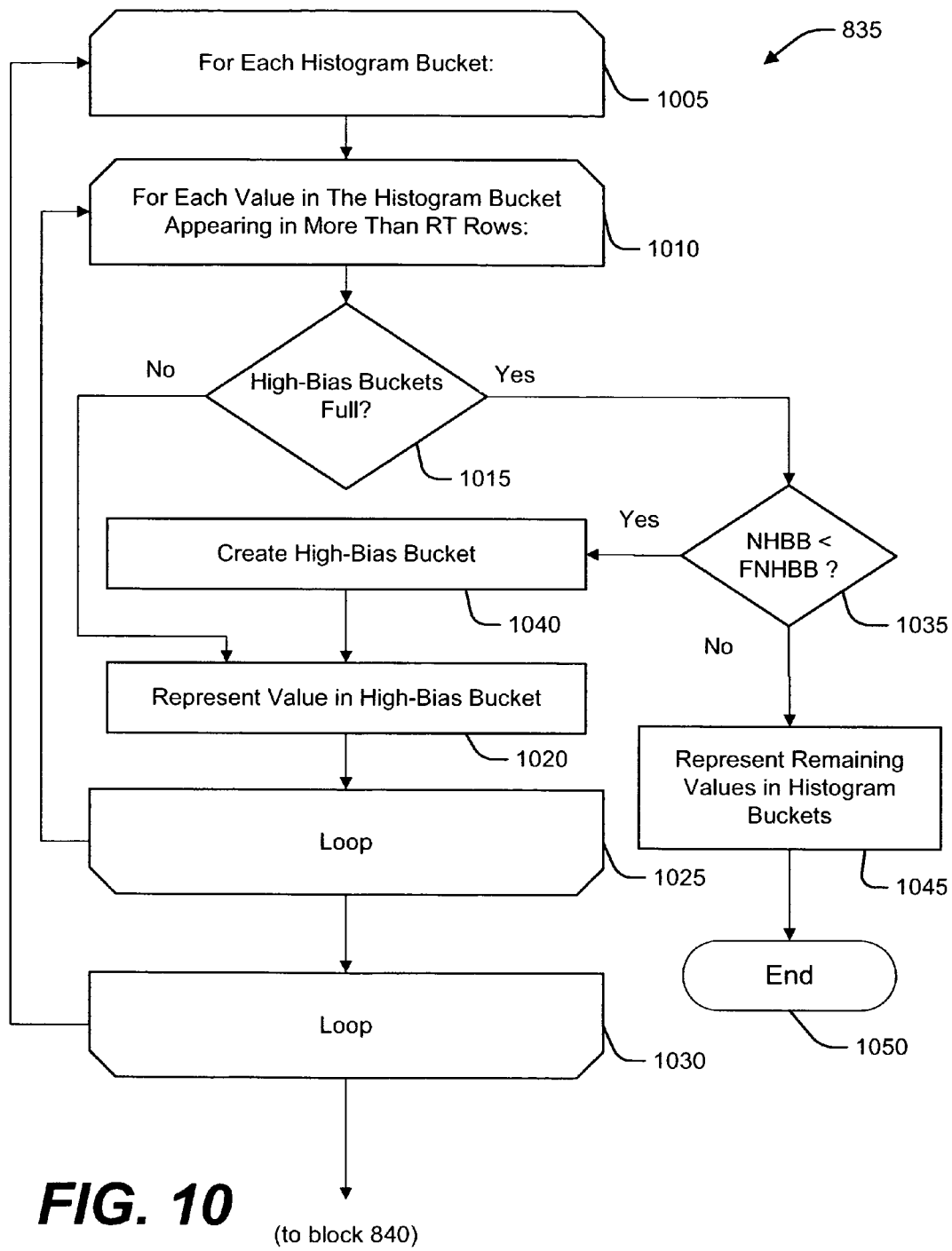
FIG. 10 is a flow chart illustrating a process for moving values from histogram buckets to high-bias buckets.

FIG. 10 provides more detail regarding moving values from histogram buckets 700 to high-bias buckets 500 (block 835). The system enters a first loop and will loop once for each histogram bucket (block 1005). Within the first loop, the system starts a second loop and will loop once for each value in the histogram bucket that appears in more than RT rows (block 1010). Inside the second loop, the system determines if the existing high-bias buckets 700 are full (block 1015). The existing high-bias buckets 700 are full if each existing high-bias bucket 700 contains F high-bias values (where each existing high-bias bucket can store F high-bias values). If the existing high-bias buckets 700 are not full, the system represents the value in one of the non-full high-bias buckets (block 1020). If there are more values in the histogram bucket 500 that appear in more than RT rows, the system returns to block 1010 (block 1025). If there are no more values in the histogram bucket 500 that appear in more than RT rows (block 1025), the system will exit the second loop and proceed to block 1030 (block 1025). If there are more histogram buckets, the system will return to block 1010 (block 1030). If there are no more histogram buckets, the system exits the first loop and proceeds to block 840 (block 1030).

If, upon entering the second loop, the existing high-bias buckets 700 are full (block 1015), the system determines if the number of existing high-bias buckets ("NHBB") is less than a fixed number of high-bias buckets 700 ("FNHBB") (block 1035). If the NHBB is less than the FNHBB, the system creates a new high-bias bucket (block 1040) and proceeds to block 1020 (which is discussed in greater detail above). If the NHBB is greater than or equal to the FNHBB, the system exits both the first and second loops (block 1035), represents the remaining values (e.g., those not represented in high-bias buckets 700) in histogram buckets 700 (block 1045), and ends (block 1050).

The FNHBB sets a maximum number of buckets that can be used to represent high-bias values. In one example system, FNHBB is infinite and consequently, referring to FIG. 10, step 1035 is omitted from the example system 835 because the NHBB will always be less than the FNHBB. Such a system will continue reclassifying values from histogram buckets 500 to high-bias buckets 700 until no values appear in more than RT rows. In another example system, FNHBB may be set to 10, or any other number. In such a system, the reclassification of values from histogram buckets 500 to high-bias buckets 700 may halt due to the FNHBB even if one or more values appear in more than RT rows.

Referring again to FIG. 8, in block 840, the system represents the remaining values (those not represented in high-bias buckets 700) in one or more histogram buckets 500. The number of histogram buckets 500 used to represent the remaining values may vary. The system will create at least one histogram bucket 500, unless all values are represented in high-bias buckets 500. The maximum number of histogram buckets, if any, may vary depending on many factors (e.g., amount and skew of data, system performance, and user preferences).

Figure 11:
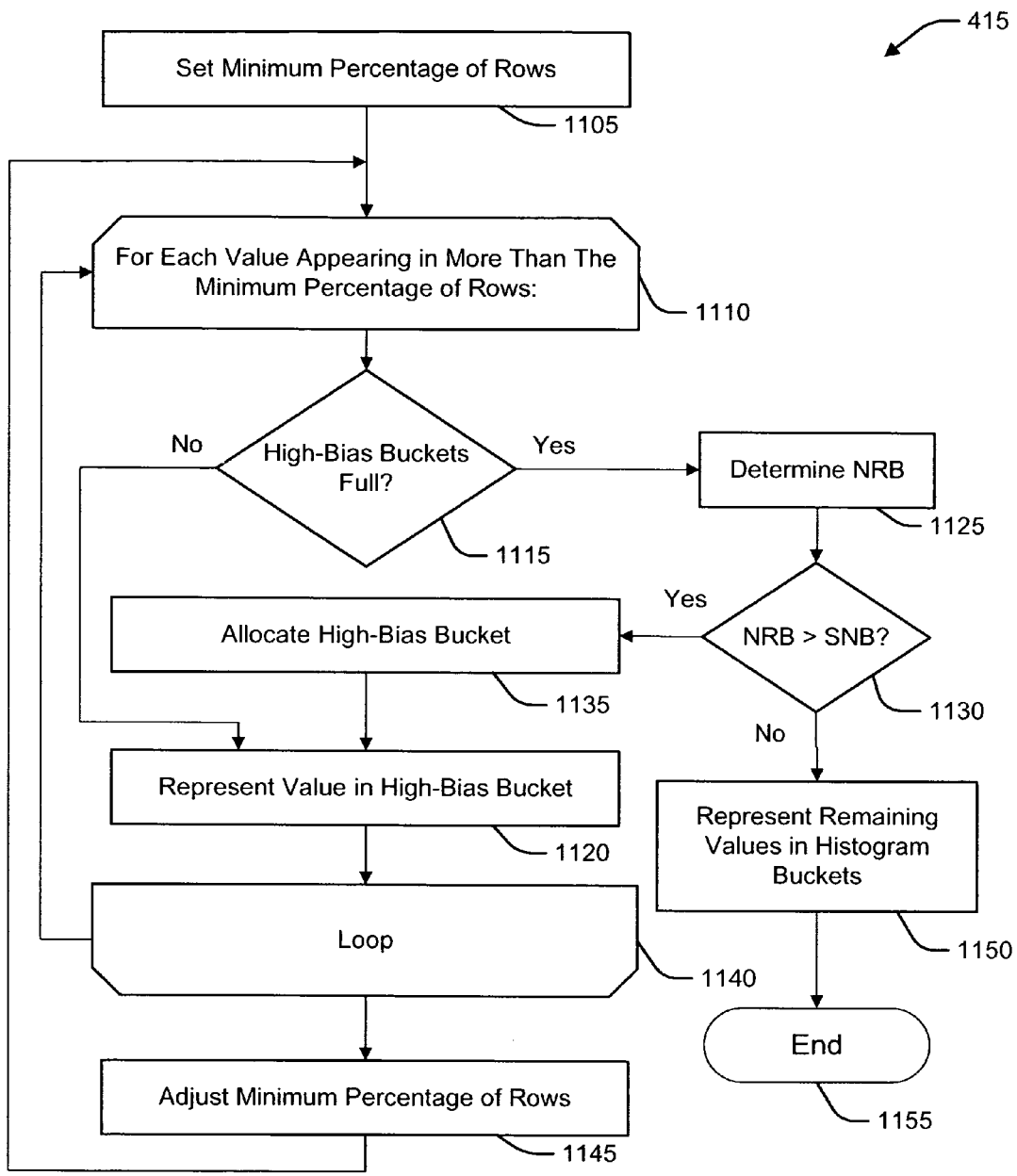
FIG. 11 is a flow chart illustrating the creation of high-bias and histogram buckets.
Figure 12:
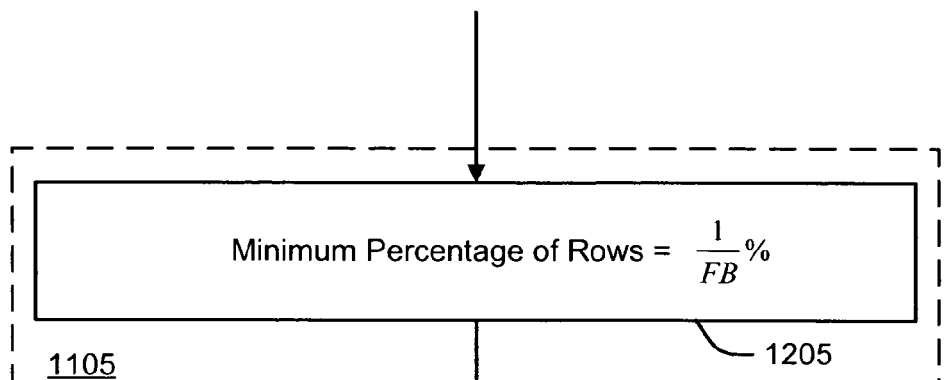
FIG. 12 is a flow chart illustrating the determination of the minimum percentage of rows.

FIG. 11 shows another example system for creating buckets (block 415) that creates high-bias and histogram buckets using a high-bias refinement technique. The system has a finite total number of buckets. The system begins by setting the minimum percentage of rows (block 1105, which is shown in FIG. 12). FIG. 12 shows an example system for setting the minimum percentage of rows (block 1105) to $$\frac{1}{FB}\%,$$

where F is the number of high-bias values that can be stored in each high-bias bucket 700, and B is the total number of buckets (block 1205).

Returning to FIG. 11, the system enters a loop and loops once for each value that appears in more than the minimum percentage of rows (block 1110). Inside the loop, the system determines if the existing high-bias buckets 700 are full (block 1115). The existing high-bias buckets 700 are full if each existing high-bias bucket 700 contains F high-bias values (where each existing high-bias bucket can store F high-bias values). If the existing high-bias buckets 700 are not full, the system represents the value in one of the non-full high-bias buckets (block 1120). If, however, the high-bias buckets 700 are full, the system determines the number of remaining buckets ("NRB") (block 1125, which is shown in more detail in FIG. 13). The system determines if the NRB is greater than the number of buckets reserved for histogram buckets, referred to as the stop number of buckets ("SNB") (block 1130).

Figure 13:
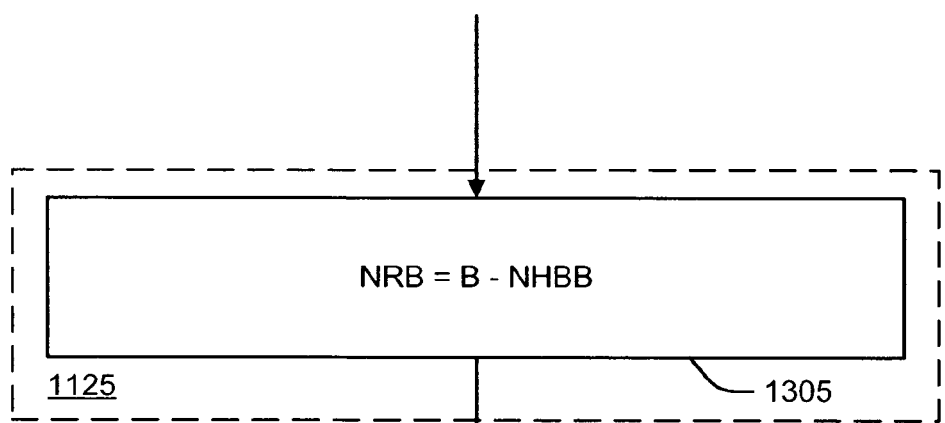
FIG. 13 is a flow chart illustrating the determination of the number of remaining buckets.

FIG. 13 shows an example system for determining the NRB (block 1125). The system determines the NRB by subtracting the number of buckets used as high-bias buckets (NHBB) from the total number of buckets (B) (block 1305).

Returning to FIG. 11, if the NRB is greater than the SNB (block 1130), the system designates one of the remaining buckets as a high-bias bucket (block 1135) and represents the value in the high-bias bucket it created (block 1120). The system proceeds to block 1140, where it will continue to loop if there are more values appearing in more than the minimum percentage of rows. If there are no more values appearing in more than the minimum percentage of rows the system adjusts the minimum percentage of rows (block 1145, which is shown in more detail in FIG. 14), and returns to block 1110.

Figure 14:
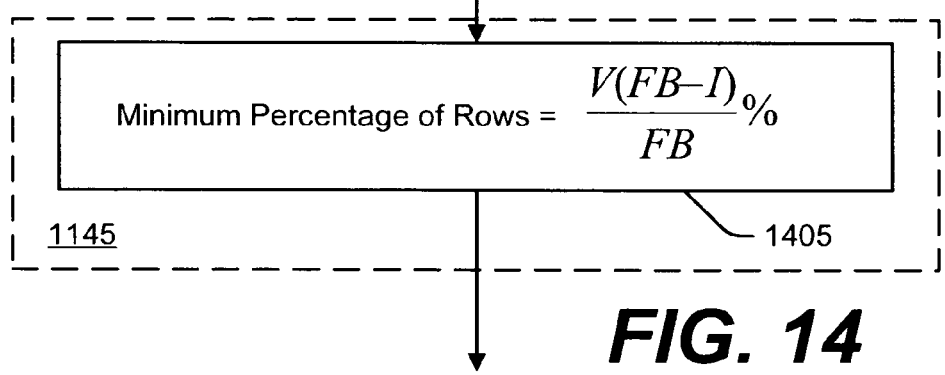
FIG. 14 is a flow chat illustrating the adjustment of the minimum percentage of rows.

FIG. 14 shows an example system for adjusting the minimum percentage of rows (block 1145). The system sets the minimum percentage of rows to $$\frac{V(FB-I)}{FB}\%,$$

where F is equal to the number of high-bias values that can be stored in each high-bias bucket 700, B is equal to the total number of buckets, V is equal to the current minimum percentage of rows, and I is equal to a number of values represented in high-bias buckets 700 (block 1405). For example, if V is equal to 0.5%, B is equal to 100, and I is equal to 36, then the adjusted minimum percentage of rows will equal $$\frac{(0.5)((2)(100)-36)}{(2)(100)}\%,$$

or 0.41%.

Returning to FIG. 11, if the NRB is less than or equal to the SNB (block 1130) the system represents the remaining values (e.g., those not represented in high-bias buckets 700) in histogram buckets 500 (block 1150) and the system ends (block 1155).

Because the system using the high-bias refinement has a fixed number of buckets, it creates a limited number of buckets to search when determining the cost of executing the SQL request. The adjustment of the minimum percentage calculated in block 1145 helps the system adapt to the distribution of data.

Figure 15:
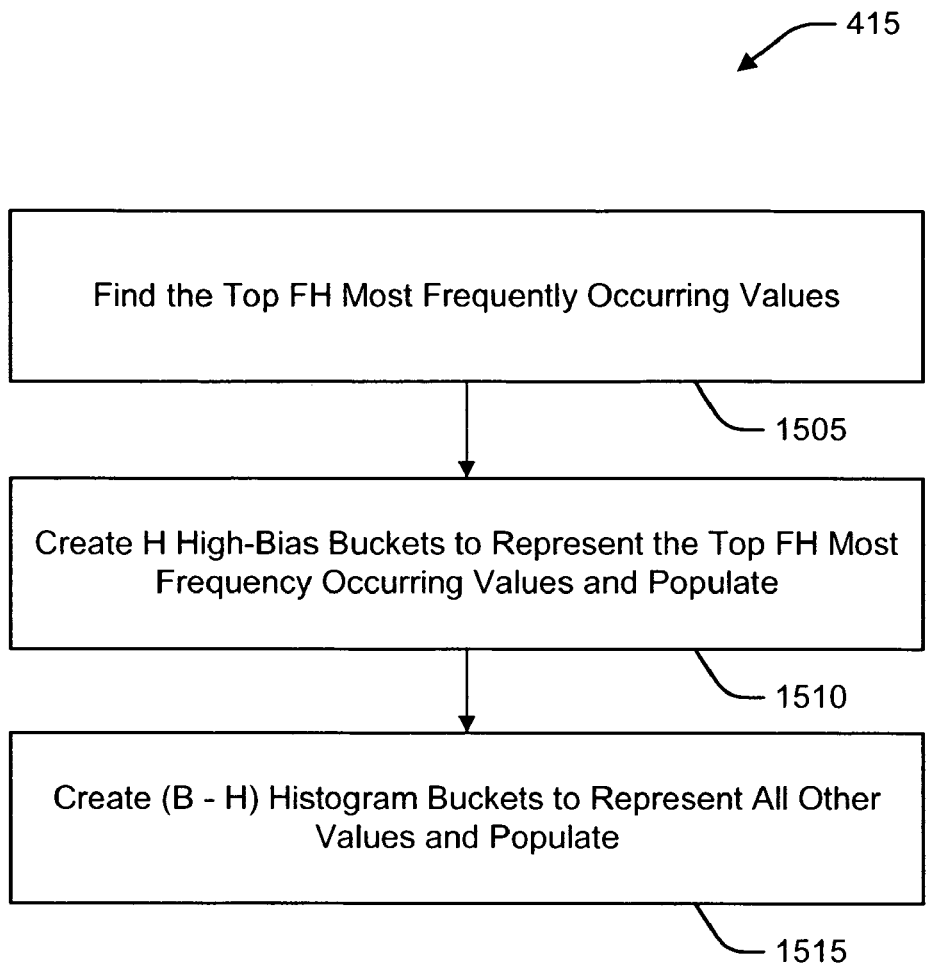
FIG. 15 is a flow chart illustrating the creation of buckets for a system having affixed number of buckets and a fixed number of high-bias buckets.

FIG. 15 shows another example system for creating buckets (block 1515) for a system having a fixed number of buckets and a fixed number of high-bias buckets 700. For example, the example system may have B total buckets and H high-bias buckets 700. Because each high-bias bucket can store F values, the system determines the FH values that are most numerous (block 1505). In an example system where each high-bias bucket 700 can store 2 high-bias values, the system determines the top 2H values. The system creates H high-bias buckets 700 to represent the top FH values determined in block 1505 and populates the high-bias buckets 700 (block 1510). The system creates (B-H) histogram buckets 500 to represent all other values and populates the histogram buckets 500 (block 1515). By having a fixed number of buckets, the system will have a limited number of buckets to search when determining the cost of executing the SQL request.

For example, if H is equal to 20, B is equal to 100, and F is equal to 2, the system creates 20 high-bias buckets 700 and populates the high-bias buckets 700 with the 40 most frequently occurring values. The system represents the remaining values in 80 histogram buckets 500. In another example where H is equal to 90, B is equal to 100, and F is equal to 2, the system creates 90 high-bias buckets 700 to represent the 180 most frequently occurring values. The system creates 10 histogram buckets 500 for representing the other values in the particular column.

The text above described one or more specific implementations of a broader invention. The invention also is carried out in a variety of alternative implementations and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other implementations are also within the scope of the following claims.

What is claimed is:

1. A method for representing statistics about a table including one or more rows, each row including a respective value, the method including:
   creating one or more histogram buckets, each histogram bucket including a width representing a respective range of values and a height representing a count of rows in the table having values in the range of values;
   creating one or more high-bias buckets, each high-bias bucket including one or more high-bias values up to a maximum number of high-bias values (F) that appear in a minimum percentage of rows in the table and for each high-bias value a number of rows that contain the high-bias value;
   where the minimum percentage of rows is computed using F and B, where B is the total number of buckets;
   repeating the following:
      (a) determining an average height of the histogram buckets;
      (b) determining a reclassification threshold based on the average height of the histogram buckets; and
      (c) concluding that a value associated with one of the one or more histogram buckets occurs in more rows of the table than the reclassification threshold, and, in response, concluding that the number of high-bias values associated with at least one of the one or more high-bias buckets has not reached the maximum number of high-bias values, and, in response, including the value in one of the high-bias buckets for which the number of high-bias values has not reached the maximum number of high-bias values;
   until no values included in any of the ranges of values associated with the histogram buckets occur in more than the reclassification threshold number of rows in the table; and
   saving in a memory the width and the height of each of the one or more histogram buckets and the one or more high-bias values and numbers of rows for each of the one or more high-bias buckets.

2. The method of claim 1, where the sum of the number of histogram buckets and the number of high-bias buckets is less than a predetermined number.

3. The method of claim 1, where the reclassification threshold is equal to the average height of the histogram buckets multiplied by (1+S), where S is a positive percentage represented as a decimal.

4. The method of claim 1, further including setting the minimum percentage of rows to $$\frac{1}{FB}\%.$$

5. The method of claim 1, further including adjusting the minimum percentage of rows to $$\frac{V(FB-I)}{FB}\%,$$

where V is equal to the minimum percentage of rows, and I is equal to a number of values represented in high-bias buckets.

6. A database system including:
   a massively parallel processing system including:
      one or more nodes;
      a plurality of CPUs, each of the one or more nodes providing access to one or more CPUs;
      a plurality of data storage facilities each of the one or more CPUs providing access to one or more data storage facilities;
      P partitions, each partition residing on one or more data storage facilities;
   a process for representing statistics, where the database system represents statistics about a table including one or more rows, each row including a respective value, the process including:
      creating one or more histogram buckets, each histogram bucket including a width representing a respective range of values and a height representing a count of rows in the table having values in the range of values;
      creating one or more high-bias buckets, each high-bias bucket including one or more high-bias values up to a maximum number of high-bias values (F) that appear in a minimum percentage of rows in the table and for each high-bias value a number of rows that contain the high-bias value;
      where the minimum percentage of rows is computed using F and B, where B is the total number of buckets;
      repeating the following:
         (a) determining an average height of the histogram buckets;
         (b) determining a reclassification threshold based on the average height of the histogram buckets; and
         (c) concluding that a value associated with one of the one or more histogram buckets occurs in more rows of the table than the reclassification threshold, and, in response, concluding that the number of high-bias values associated with at least one of the one or more high-bias buckets has not reached the maximum number of high-bias values, and, in response, including the value in one of the high-bias buckets for which the number of high-bias values has not reached the maximum number of high-bias values;
      until no values included in any of the ranges of values associated with the histogram buckets occur in more than the reclassification threshold number of rows in the table; and
      saving in a memory the width and the height of each of the one or more histogram buckets and the one or more high-bias values and numbers of rows for each of the one or more high-bias buckets.

7. The database system of claim 6, where the sum of the number of histogram buckets and the number of high-bias buckets is less than a predetermined number.

8. The database system of claim 6, where the reclassification threshold is equal to the average height of the histogram buckets multiplied by (1+S), where S is a positive percentage represented as a decimal.

9. The database system of claim 6, further including setting the minimum percentage of rows to $$\frac{1}{FB}\%.$$

10. The database system of claim 6, further including adjusting the minimum percentage of rows to $$\frac{V(FB-I)}{FB}\%,$$

where V is equal to the minimum percentage of rows, and I is equal to a number of values represented in high-bias buckets.

11. A computer program, stored on a tangible storage medium, for use in representing statistics in a database running in a partitioned parallel environment including P partitions, each partition residing on one or more parallel processing systems, the database including a first table including one or more rows stored in one or more of the P partitions, the program including executable instructions that cause a computer to:
  represent statistics about a table including one or more rows, each row including one or more values, the program further causing the computer to:
    create one or more histogram buckets, each histogram bucket including a width representing a respective range of values and a height representing a count of rows in the table having values in the range of values;
    create one or more high-bias buckets, each high-bias bucket including one or more high-bias values up to a maximum number of high-bias values (F) that appear in a minimum percentage of rows in the table and for each high-bias value a number of rows that contain the high-bias value;
    where the minimum percentage of rows is computed using F and B, where B is the total number of buckets;
    repeat the following:
      (a) determine an average height of the histogram buckets;
      (b) determine a reclassification threshold based on the average height of the histogram buckets; and
      (c) conclude that a value associated with one of the one or more histogram buckets occurs in more rows of the table than the reclassification threshold, and, in response, conclude that the number of high-bias values associated with at least one of the one or more high-bias buckets has not reached the maximum number of high-bias values, and, in response, include the value in one of the high-bias buckets for which the number of high-bias values has not reached the maximum number of high-bias values;
    until no values included in any of the ranges of values associated with the histogram buckets occur in more than the reclassification threshold number of rows in the table; and
    save in a memory the width and the height of each of the one or more histogram buckets and the one or more high-bias values and numbers of rows for each of the one or more high-bias buckets.

12. The computer program of claim 11, where the sum of the number of histogram buckets and the number of high-bias buckets is less than a predetermined number.

13. The computer program of claim 11, where the reclassification threshold is equal to the average height of the histogram buckets multiplied by (1+S), where S is a positive percentage represented as a decimal.

14. The computer program of claim 11, further including executable instructions that cause the computer to set the minimum percentage of rows to $$\frac{1}{FB}\%.$$

15. The computer program of claim 11, further including executable instructions that cause the computer to adjust the minimum percentage of rows to $$\frac{V(FB-I)}{FB}\%,$$

where V is equal to the minimum percentage of rows, and I is equal to a number of values represented in high-bias buckets.

* * * * *